US012634363B2

(12) United States Patent
Fukatani et al.

(10) Patent No.: US 12,634,363 B2
(45) Date of Patent: May 19, 2026

(54) STORAGE SYSTEM

(71) Applicant: Hitachi Vantara, Ltd., Yokohama (JP)

(72) Inventors: Takayuki Fukatani, Tokyo (JP);
Nobuhiro Yokoi, Tokyo (JP); **Hitoshi
Hayakawa, Tokyo (JP); Tomohiro
Yoshihara**, Tokyo (JP)

(73) Assignee: Hitachi Vantara, Ltd., Yokohama (JP)

( * ) Notice: Subject to any disclaimer, the term of this
patent is extended or adjusted under 35
U.S.C. 154(b) by 43 days.

(21) Appl. No.: 18/830,273

(22) Filed: Sep. 10, 2024

(65) Prior Publication Data

US 2025/0267190 A1      Aug. 21, 2025

(30) Foreign Application Priority Data

Feb. 21, 2024      (JP) ................................. 2024-024712

(51) Int. Cl.
H04L 67/104 (2022.01)
H04L 67/1097 (2022.01)

(52) U.S. Cl.
CPC ...... H04L 67/1055 (2013.01); H04L 67/1097
(2013.01)

(58) Field of Classification Search
CPC ............. H04L 67/1055; H04L 67/1097; H04L
43/0817
See application file for complete search history.

(56) References Cited

U.S. PATENT DOCUMENTS

| | | | | |
|---|---|---|---|---|
| 11,700,214 | B1 | 7/2023 | Yokoi et al. | |
| 2016/0041877 | A1* | 2/2016 | Zhou ................... | G06F 11/2094 |
| | | | | 714/6.23 |
| 2019/0012113 | A1* | 1/2019 | Spencer ................ | G06F 3/0656 |
| 2020/0387406 | A1* | 12/2020 | Xu ........................ | G06F 9/5072 |
| 2020/0409583 | A1* | 12/2020 | Kusters ............... | G06F 11/1612 |
| 2021/0072893 | A1* | 3/2021 | Singh .................. | G06F 13/4022 |
| 2021/0303523 | A1* | 9/2021 | Periyagaram ........... | G06F 3/061 |

* cited by examiner

*Primary Examiner* — Farzana B Huq
(74) *Attorney, Agent, or Firm* — PROCOPIO, CORY,
HARGREAVES & SAVITCH LLP

(57) ABSTRACT

A storage system includes a controller, in which the con-
troller includes a front-end interface that communicates with
a host via a network and management information, the
management information includes information indicating
communication performance of the front-end interface with
the host, and a communication control parameter in a session
between the host and the front-end interface is determined
based on the communication performance.

18 Claims, 16 Drawing Sheets

HOST SERVER 200

MEMORY 203

APPLICATION PROGRAM
P41

STORAGE ACCESS PROGRAM
P43

CPU
202

STORAGE
DEVICE
204

NETWORK
I/F 201

MANAGEMENT SERVER 50

MEMORY 53

MANAGEMENT
SERVER PROGRAM
P50

CPU
52

STORAGE
DEVICE
54

NETWORK
I/F 51

| PORT ID C101 | CONTROLLER ID C102 | FE I/F ID C103 | IP ADDRESS C104 | PROTOCOL TYPE C105 |
|---|---|---|---|---|
| P0-A0-0 | CTRL0 | FE0-A | 192.0.10.1 | NVMe/TCP |
| P0-A0-1 | CTRL0 | FE0-A | 192.0.10.2 | NVMe/TCP |
| P0-A1-0 | CTRL0 | FE0-A | 192.0.20.1 | NVMe/TCP |
| P0-A1-1 | CTRL0 | FE0-A | 192.0.20.2 | NVMe/TCP |
| P1-A0-0 | CTRL1 | FE1-A | 192.0.40.1 | NVMe/TCP |
| P1-A1-0 | CTRL1 | FE1-A | 192.0.50.2 | NVMe/TCP |

| LDEV ID C201 | CONTROLLER IN CHARGE C202 | USE PDEV C203 | CAPACITY C204 |
|---|---|---|---|
| LDEV1 | CTRL0 | PDEV1 | 5TB |
| LDEV2 | CTRL0 | PDEV2 | 5TB |
| LDEV3 | CTRL0 | PDEV3 | 5TB |
| LDEV4 | CTRL1 | PDEV4 | 5TB |

| Subsystem ID C301 | Subsystem NQN C302 | PORT ID C303 | Host NQN C304 | HOST PERFORMANCE REQUIREMENT C305 | HOST OS C306 | Namespace NUMBER C307 | LDEV C308 | IO QUEUE LENGTH C309 | APPLICATION C310 |
|---|---|---|---|---|---|---|---|---|---|
| SUB0 | nqn.2023.com.hitachi:sn.0 | P0-A0-0 | nqn.2023.host1 | HIGH | Windows | 1 | LDEV1 | 128 | WAN ACCESS |
| | | P0-A1-0 | | | | 2 | LDEV2 | | |
| | | P1-A0-0 | | | | 3 | LDEV3 | | |
| SUB1 | nqn.2023.com.hitachi:sn.1 | P0-A0-0 | nqn.2023.com.hitachi:sn.1 | MEDIUM | Ubuntu Linux | 1 | LDEV5 | 128 | LAN ACCESS |
| SUB2 | nqn.2023.com.hitachi:sn.2 | P0-A1-0 | nqn.2023.com.hitachi:sn.2 | MEDIUM | Ubuntu Linux | 1 | LDEV7 | 128 | REMOTE BACKUP |

| FE I/F ID C401 | MOUNTING CONTROLLER C402 | NUMBER OF PORTS C403 | NUMBER OF CPU CORES C404 | MEMORY CAPACITY C405 | IOPS C406 | 1IO PROCESSING TIME C407 |
|---|---|---|---|---|---|---|
| FE0-A | CTRL0 | 2 | 8 | NORMAL | 200Kiops | 200 us |
| FE1-A | CTRL1 | 2 | 8 | CLOSED | 200Kiops | 200 us |

| HOST NQN C501 | HOST ID C502 | PORT ID C503 | Subsystem NQN C504 | SESSION NUMBER C505 | IO CONNECTION NUMBER UPPER LIMIT C506 | COMMUNICATION BUFFER AMOUNT C507 | In-capsule DATA UPPER LIMIT C508 | IO QUEUE LENGTH C509 | RTT C510 |
|---|---|---|---|---|---|---|---|---|---|
| nqn.2023.host1 | 1 | P0-A0-0 | nqn.2023.com. hitachi:sn.0 | 0 | 4 | 4M | 32KB | 128 | 4ms |
| nqn.2023.host2 | 1 | P0-A1-0 | nqn.2023.com. hitachi:sn.1 | 0 | 4 | 1M | 8KB | 128 | 1ms |
| nqn.2023.host3 | 1 | P1-A0-0 | nqn.2023.com. hitachi:sn.2 | 0 | 4 | 1M | 8KB | 128 | 1ms |

| HOST IP ADDRESS C601 | HOST PORT NUMBER C602 | PORT ID C603 | TARGET IP ADDRESS C604 | TARGET PORT NUMBER C605 | SESSION NUMBER C606 | CONNECTION NUMBER C607 | CONNECTION TYPE C608 |
|---|---|---|---|---|---|---|---|
| 192.168.0.2 | 4040 | P0-A0-0 | 192.168.0.1 | 4420 | 0 | 0 | MANAGEMENT |
| 192.168.0.2 | 4041 | P0-A0-0 | 192.168.0.1 | 4420 | 0 | 1 | IO |
| 192.168.0.2 | 4042 | P0-A0-0 | 192.168.0.1 | 4420 | 0 | 2 | IO |

FIG. 14

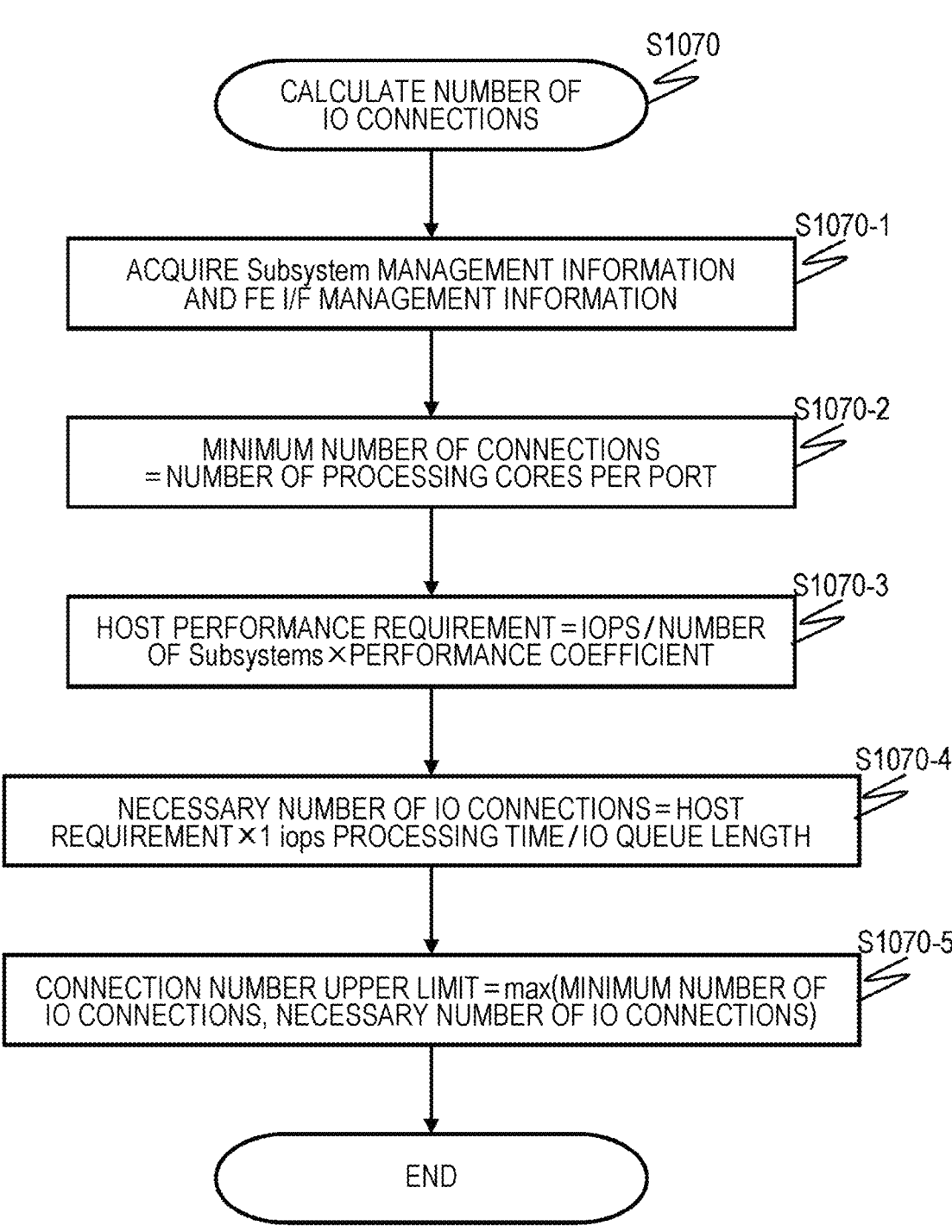

S1070

CALCULATE NUMBER OF
IO CONNECTIONS

S1070-1

ACQUIRE Subsystem MANAGEMENT INFORMATION
AND FE I/F MANAGEMENT INFORMATION

S1070-2

MINIMUM NUMBER OF CONNECTIONS
= NUMBER OF PROCESSING CORES PER PORT

S1070-3

HOST PERFORMANCE REQUIREMENT = IOPS / NUMBER
OF Subsystems × PERFORMANCE COEFFICIENT

S1070-4

NECESSARY NUMBER OF IO CONNECTIONS = HOST
REQUIREMENT × 1 iops PROCESSING TIME / IO QUEUE LENGTH

S1070-5

CONNECTION NUMBER UPPER LIMIT = max(MINIMUM NUMBER OF
IO CONNECTIONS, NECESSARY NUMBER OF IO CONNECTIONS)

END

S1080

CALCULATE
COMMUNICATION BUFFER

S1080-1

RTT > 1ms or
APPLICATION = "WAN ACCESS" or
APPLICATION = "REMOTE BUFFER" or

Yes                                    No

S1080-2                                S1080-3

Incapsule-data SIZE UPPER LIMIT
= 8KB × 2 ^ SQRT(RTT / 1ms)

Incapsule-data SIZE UPPER LIMIT
= 8KB

S1080-4

COMMUNICATION BUFFER SIZE =
Incapsule-data SIZE UPPER LIMIT × IO QUEUE LENGTH

END

FIG. 16

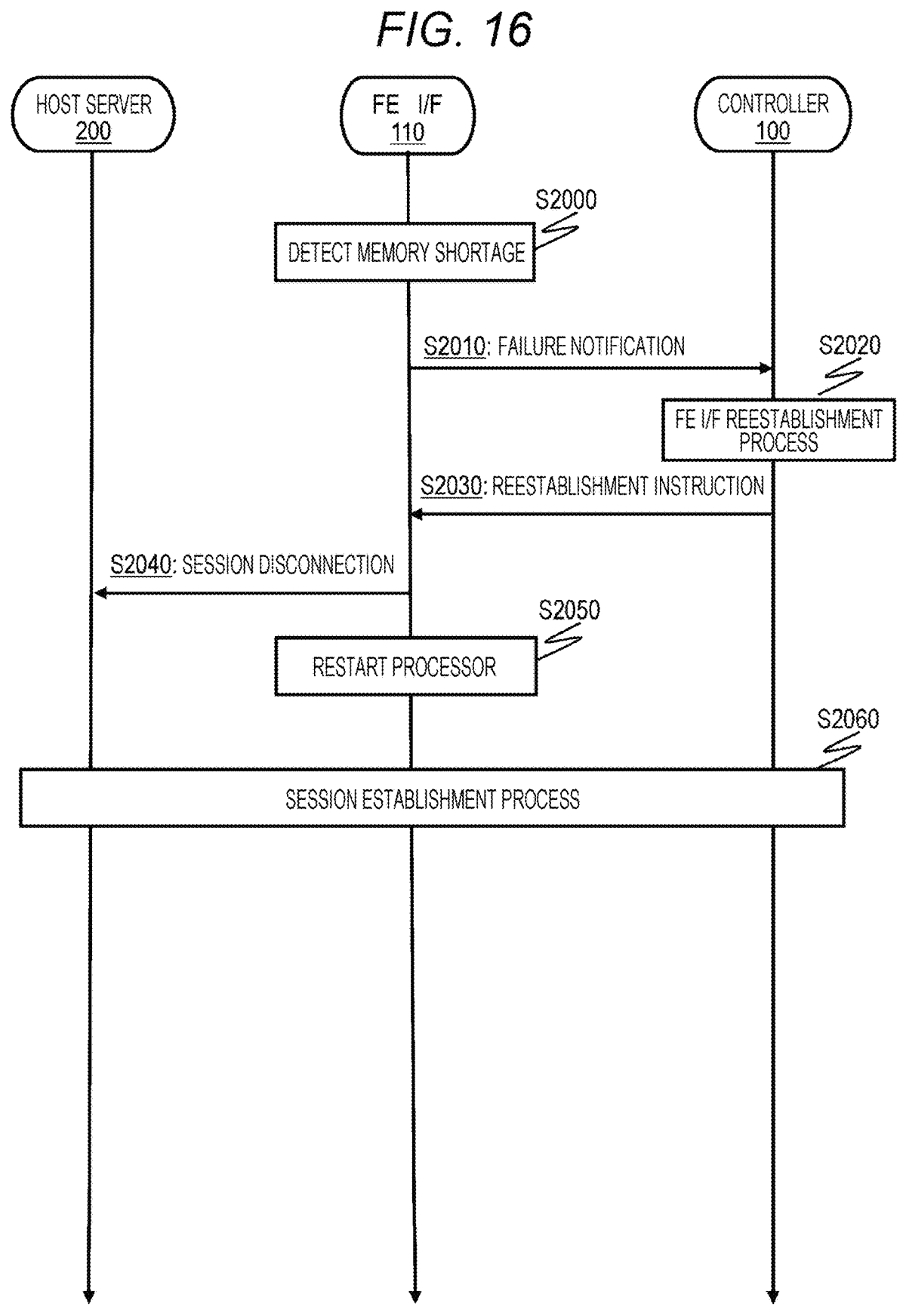

HOST SERVER
200

FE I/F
110

CONTROLLER
100

S2000
DETECT MEMORY SHORTAGE

S2010: FAILURE NOTIFICATION

S2020
FE I/F REESTABLISHMENT PROCESS

S2030: REESTABLISHMENT INSTRUCTION

S2040: SESSION DISCONNECTION

S2050
RESTART PROCESSOR

S2060
SESSION ESTABLISHMENT PROCESS

| Subsystem SETTING INTERFACE | | |
|---|---|---|

Subsystem NQN                    I10

Namespace

| 1 | LDEV01 | ▼ |   I20 |
|---|---|---|---|
| 2 | LDEV02 | ▼ |
| 3 |  | ▼ |

Port

| ☑ | P0-A0-0 |
|---|---|
| ☐ | P0-A1-0 |
| ☑ | P1-A0-0 |
| ☐ | P1-A1-0 |

I30

Host

Host NQN                    I40

PERFORMANCE REQUIREMENT    HIGH ▼    I50

Host OS    Ubuntu Linux ▼    I60

APPLICATION    WAN ACCESS ▼    I70

I80                    I90

| DETERMINE | CANCEL |
|---|---|

FIG. 18

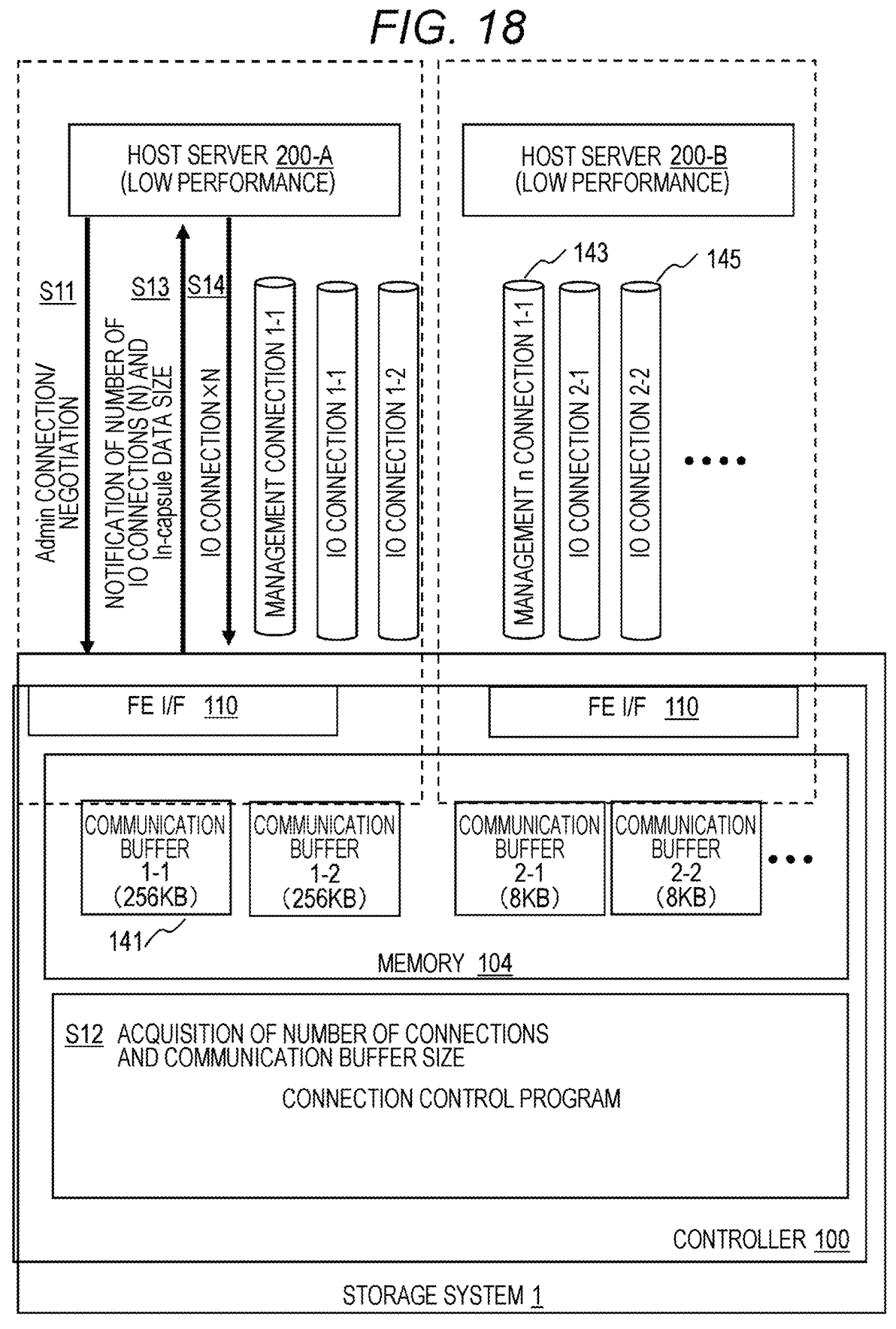

HOST SERVER 200-A
(LOW PERFORMANCE)

HOST SERVER 200-B
(LOW PERFORMANCE)

S11

S13  S14

Admin CONNECTION/NEGOTIATION

NOTIFICATION OF NUMBER OF IO CONNECTIONS (N) AND In-capsule DATA SIZE

IO CONNECTION×N

MANAGEMENT CONNECTION 1-1

IO CONNECTION 1-1

IO CONNECTION 1-2

MANAGEMENT n CONNECTION 1-1 — 143

IO CONNECTION 2-1

IO CONNECTION 2-2 — 145

. . . .

FE I/F  110

FE I/F  110

COMMUNICATION BUFFER 1-1 (256KB)

COMMUNICATION BUFFER 1-2 (256KB)

COMMUNICATION BUFFER 2-1 (8KB)

COMMUNICATION BUFFER 2-2 (8KB)

. . .

141

MEMORY 104

S12  ACQUISITION OF NUMBER OF CONNECTIONS AND COMMUNICATION BUFFER SIZE

CONNECTION CONTROL PROGRAM

CONTROLLER 100

STORAGE SYSTEM 1

STORAGE SYSTEM

CLAIM OF PRIORITY

The present application claims priority from Japanese patent application JP 2024-024712 filed on Feb. 21, 2024, the content of which is hereby incorporated by reference into this application.

BACKGROUND OF THE INVENTION

1. Field of the Invention

The present invention relates to a storage system.

2. Description of the Related Art

In recent storage systems, a storage area network (SAN) has been spread as a form of coupling a storage and a host server. In a configuration of an SAN, a storage and a host server are coupled via a switch by using a network cable such as an optical fiber. Storage resources can be shared among a plurality of host servers via an SAN.

There are a Fibre Channel (FC)-SAN using FC and an Internet Protocol (IP)-SAN using Ethernet as types of SAN. Since the FC-SAN performs lossless data transfer by using a dedicated interface module and switch, it is possible to configure a highly reliable and mission critical IT system. On the other hand, the IP-SAN is based on a standard IP protocol, and can be easily handled without the advanced expertise required for the FC-SAN. By performing retransmission control of communication data in the TCP layer of the upper protocol, reliability is secured, and adoption in mission critical IT systems is also increasing. In addition, with the spread of 100 Gb Ethernet and 200 Gb Ethernet, a bandwidth is also widened, and expectations for the IP-SAN are increasing.

Non-Volatile Memory Express over Transmission Control Protocol (NVMe/TCP) is becoming widespread as a high-performance new protocol for an IP-SAN. The NVMe/TCP realizes a wide band by coupling a host server and a storage system via a plurality of connections and increasing the IO parallelism. Furthermore, the number of times communication is performed between a host server and a storage system is reduced by in-capsule data in which collective communication of a Write command and data is performed, and performance degradation due to a communication delay is curbed.

U.S. Pat. No. 11,700,214 discloses a a storage utilizing smart NIC system in which a smart NIC is mounted in a storage system and block protocol processing is performed by the smart NIC. The smart NIC is a network interface device equipped with a processor and a memory. The smart NIC can operate a general-purpose operating system (OS) or an open source software (OSS) protocol server without any change, for example. Offloading block protocol processing from a controller to the smart NIC of the storage system reduces a load on the controller and improves the performance of the storage system. On the other hand, the smart NIC has limited hardware resources compared with the controller, and thus the usable memory capacity is also reduced.

The block protocol mentioned herein is a data communication protocol for reading and writing data in units of fixed-length blocks. In a storage that provides a block protocol, a physical storage region is divided into subsystems (logical units), and data access in units of blocks to a host server can be performed. The block access is a data access method using a block protocol via a network.

SUMMARY OF THE INVENTION

As described above, the network interface device including the processor and the memory can reduce the load of the storage controller. In the related art, a storage system prepares a communication buffer for in-capsule data in a memory in a network interface device for each connection. In a case where a host server and a storage system are coupled via a plurality of connections as in NVMe/TCP, the number of connections per host increases. As a result, the following problems occur when a large number of hosts are coupled.

The first problem is that it is better to increase the number of connections and increase the IO parallelism for a host server with high performance requirements. Coupling with the same number of connections as the number of CPU cores of the host server enables parallel processing by all the CPU cores and load distribution among the CPU cores. On the other hand, in a case where connections of an unlimited number are coupled to all the host servers, memory consumption of a network interface device in a storage system is large, and is insufficient at the time of coupling to a large number of hosts.

The second problem is that the host server that remotely communicates with the storage system should have a larger communication buffer for storing in-capsule data to reduce the number of times of communication. On the other hand, in a case where the communication buffer size is allocated to all the connections, memory consumption of the network interface device may be large and a memory shortage may occur when a large number of hosts are coupled.

According to an aspect of the present invention, there is provided a storage system including controller, in which the controller includes a front-end interface that communicates with a host via a network, and management information, the management information includes information indicating communication performance of the front-end interface with the host, and the controller determines a communication control parameter in a session between the host and the front-end interface based on the communication performance.

According to one aspect of the present invention, communication between the storage system and the host can be more appropriately controlled.

BRIEF DESCRIPTION OF THE DRAWINGS

FIG. 7 is a diagram illustrating an example of a port management table of the storage system of the first embodiment;

3

Figure 13:
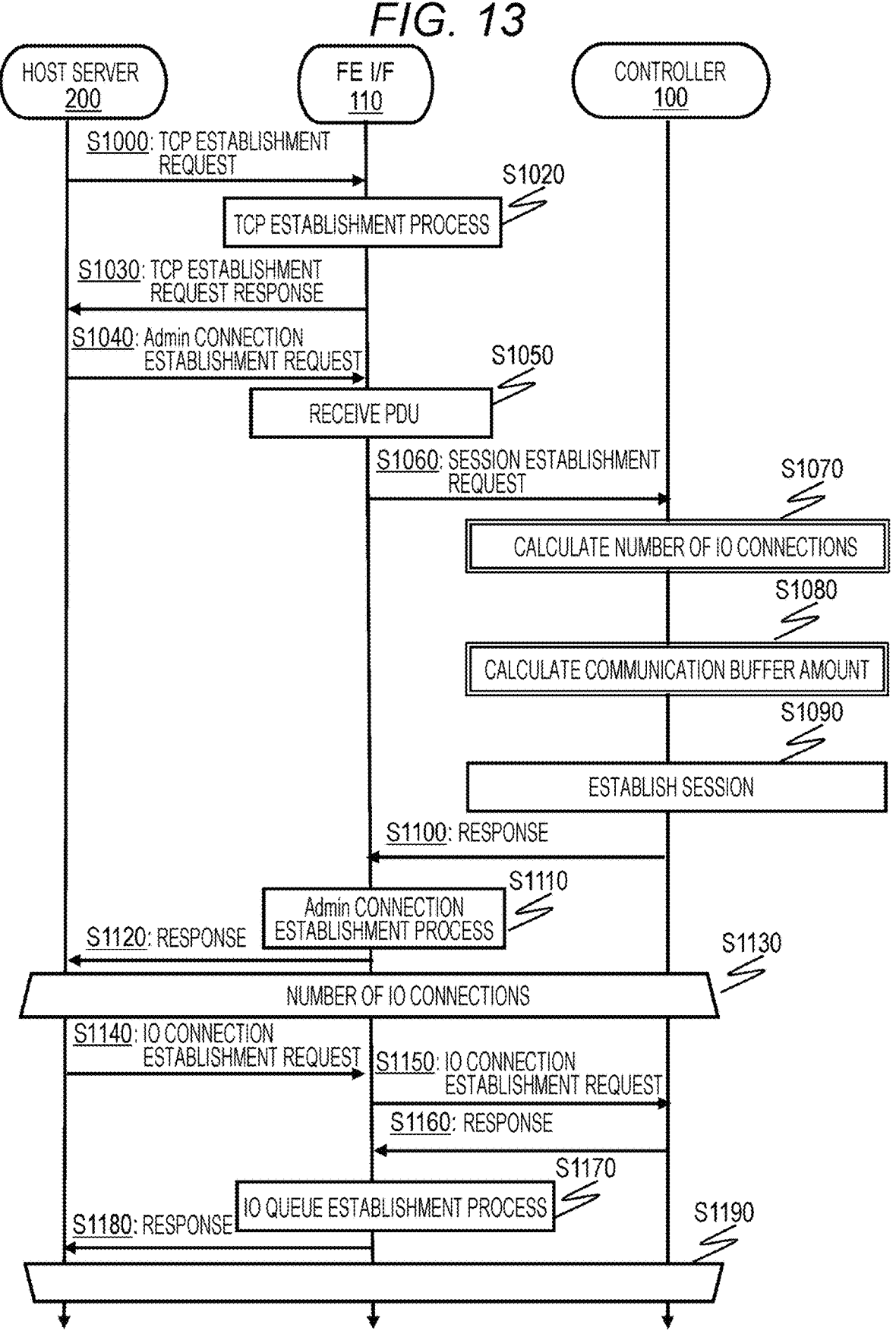
Figure 15:
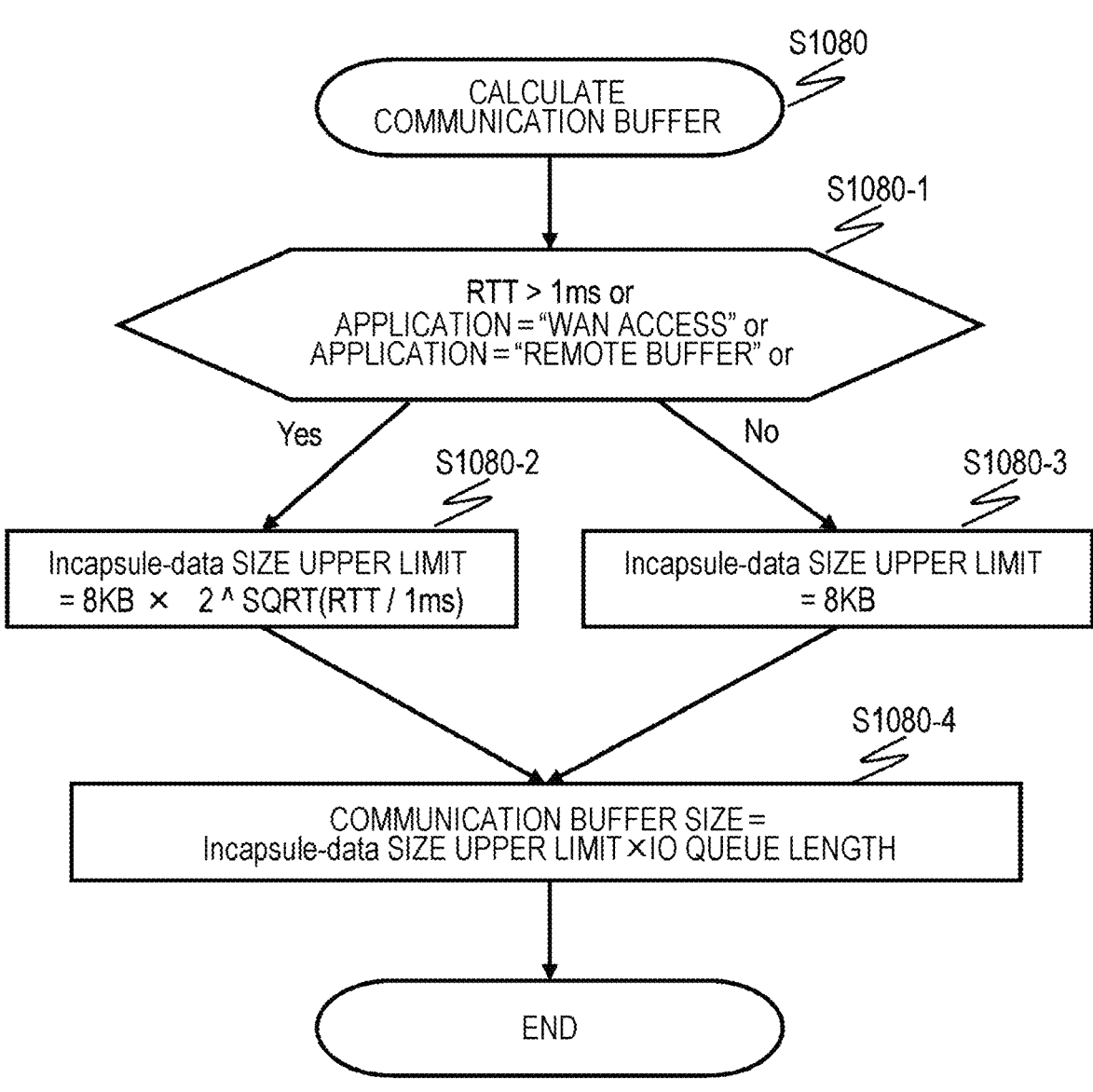

FIG. 8 is a diagram illustrating an example of an LDEV management table of the storage system of the first embodiment;

FIG. 9 is a diagram illustrating an example of a subsystem management table of the storage system of the first embodiment;

FIG. 10 is a diagram illustrating an example of an FE I/F management table of the storage system of the first embodiment;

FIG. 11 is a diagram illustrating an example of a session management table of the storage system of the first embodiment;

FIG. 12 is a diagram illustrating an example of a connection management table of the storage system according to the first embodiment;

FIG. 13 is a diagram illustrating an example of a session establishment process of the storage system of the first embodiment;

FIG. 14 is a diagram illustrating an example of connection number calculation process of the storage system according to the first embodiment;

FIG. 15 is a diagram illustrating an example of a communication buffer amount calculation process of the storage system of the first embodiment;

FIG. 16 is a diagram illustrating an example of a session reestablishment process of the storage system according to the first embodiment;

FIG. 17 is a diagram illustrating an example of a subsystem configuration setting interface of the storage system of the first embodiment; and FIG. 18 is a diagram illustrating an outline of a storage system of a second embodiment.

DESCRIPTION OF THE PREFERRED EMBODIMENTS

In the following description, some embodiments will be described with reference to the drawings. The present embodiments do not limit the scope of the claims of the present invention, and not all the elements described in the embodiments are necessary for solving the problems in the present invention. In the following description, when it is necessary for convenience, the description will be divided into a plurality of sections or embodiments, but unless otherwise specified, the sections or embodiments are not unrelated to each other, and one is in a relationship of some or all modifications, details, supplementary explanation, and the like of the other. Furthermore, in the following description, in a case where the number of elements and the like (including the number, a numerical value, an amount, a range, and the like) are described, the number of elements is not limited to a specific number unless otherwise stated or unless clearly limited to the specific number in principle, and the number of elements may be greater than or equal to or less than the specific number.

First Embodiment

In a first embodiment, a storage utilizing smart NIC is assumed in which a smart NIC is mounted in a storage system and protocol processing is offloaded from a processor of a controller (also referred to as a storage controller) that performs data access control of the storage system to the smart NIC. The smart NIC is a highly functional network card that can program (add) a function desired by a user by using software or hardware, and is a front-end interface device. The smart NIC can execute functions of, for example, a network layer, a transport layer, and an application layer above the transport layer, in addition to communication processing of a physical layer or a data link layer performed in a conventional network card.

In the present embodiment, when a storage system receives a session establishment request from a host server, connection control parameters such as the number of connections and a communication buffer capacity are changed according to a performance requirement of the host server, a distance to the storage system, and a configuration of the storage system, thereby reducing a memory consumption amount while maintaining the performance.

The following description of the smart NIC can also be applied to an interface device having a programmable logic circuit configuration such as a field programmable gate array (FPGA) in addition to an interface device in which a function can be programmed by software executed by a processor. The FPGA may include a logic circuit that realizes each function implemented by a program and a cache memory used in operation.

Hereinafter, the first embodiment will be described with reference to FIGS. 1 to 17.

Outline of First Embodiment

Figure 1:
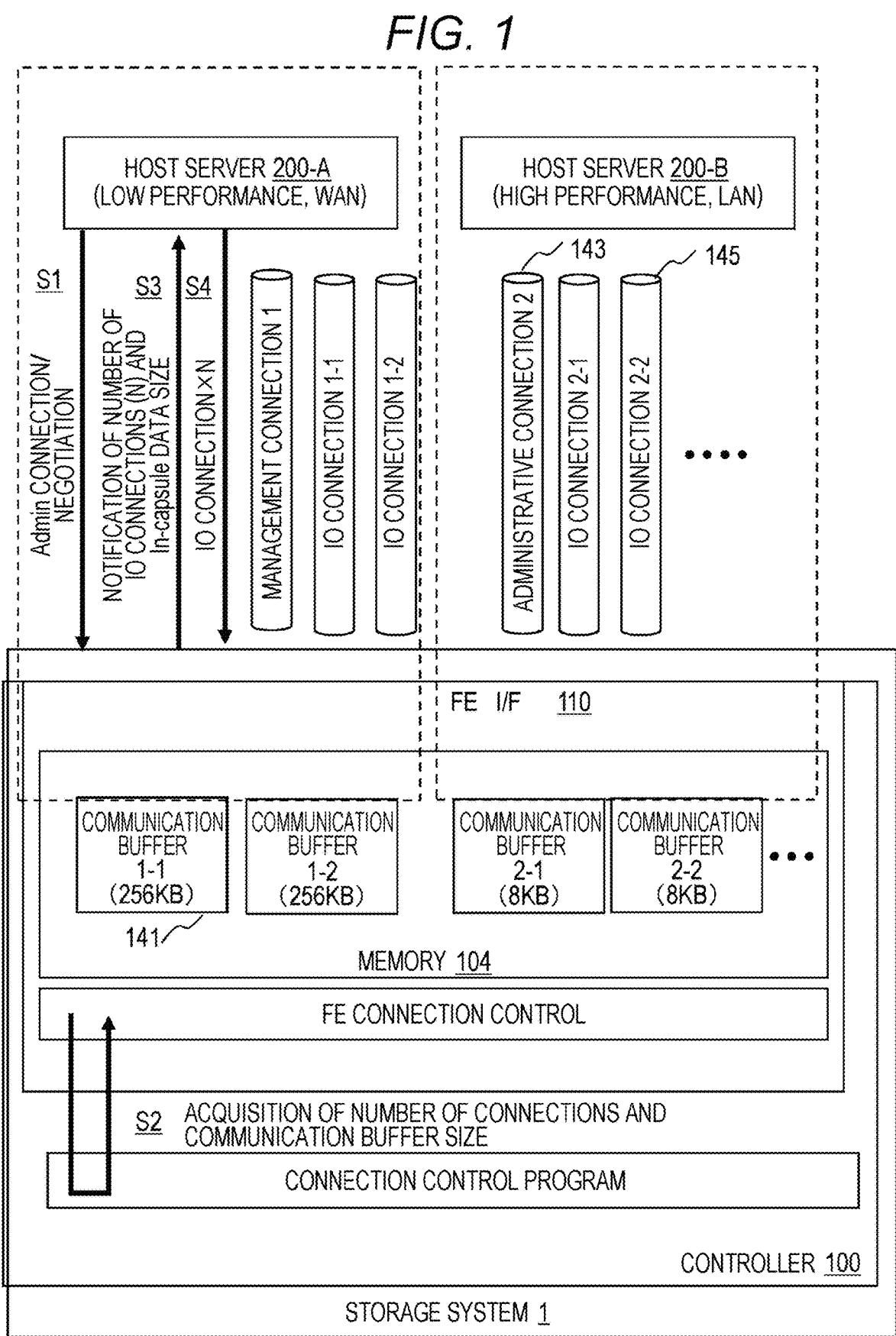
FIG. 1 is a diagram illustrating an outline of a storage system according to a first embodiment.

FIG. 1 is a schematic diagram of the first embodiment. In a storage system 1, an FE I/F 110 is coupled to a controller 100. A smart NIC is used as the FE I/F 110, and the FE I/F 110 processes a block protocol such as NVMe/TCP. The FE I/F 110 provides a subsystem provided by the controller 100 to a host server 200.

The subsystem mentioned here is a concept of a storage resource managed by the controller, and includes a plurality of namespaces. A namespace is a logical storage region (logical volume) that provides a logical capacity to the host server 200. The host server 200 designates the subsystem with an NVMe qualified name (NQN) which is an identifier of the subsystem and accesses the subsystem.

When a session establishment request is received from the host server 200 (representing the host server 200-A or 200-B), the storage system 1 performs processes from S1 to S4 described below, thereby realizing connection control according to performance requirements of the host and a configuration on the storage side. The session mentioned here indicates establishment between one host server 200 and one subsystem provided by the storage system 1. The session is used for the host server 200 to transmit a command for control and a command for data access to the storage system 1.

(S1) For session establishment to the storage system 1, the host server 200 transmits a session establishment request for a administrative connection 143 as the first connection of the session. In FIG. 1, one administrative connection is indicated by the reference numeral 143 as an example. The administrative connection 143 mentioned here is a connection used by the host server 200 for negotiation of communication parameters such as a transfer length with the storage system 1, on/off of various protocol functions, an upper limit of an in-capsule data size, and the number of IO connections, and monitoring of life and death. The storage system 1 that has received the establishment request for the administrative connection 143 permits establishment of the administrative connection 143. Thereafter, the host server 200 transmits a negotiation request for setting a communication parameter to the storage system 1.

(S2) The FE I/F 110 in the storage system 1 that has received the negotiation request inquires of the controller 100 about the number of IO connections and a communication buffer size for the in-capsule data. The controller 100 calculates the number of connections permitted to the host server 200, the communication buffer size, and an upper limit of an in-capsule data size from the performance requirements and applications of the host server 200, the performance information and configuration information of the storage system 1, and a round trip time (RTT) between the host server 200 and the storage system 1 input by a user in advance, and gives a response to the FE I/F 110. Note that the RTT mentioned here is a time (round-trip time of communication) from transmission of data to a communication partner to return of a response.

(S3) The FE I/F 110 returns, to the host server 200, the number of connections and the in-capsule data size upper limit received from the controller 100. The in-capsule data size upper limit indicates an upper limit of the size of data (for example, host write data to be written from the host to the physical storage device) excluding a command. Here, the number of connections is denoted by N.

(S4) The host server 200 requests the storage system 1 to establish N IO connections 145. In FIG. 1, one IO connection is indicated by the reference numeral 145 as an example. Upon receiving the IO connection establishment request, the FE I/F 110 establishes each IO connection establishment, and allocates a communication buffer 141 having the size obtained in S3 for each IO connection 145. In FIG. 1, one communication buffer is indicated by the reference numeral 141 as an example. Thereafter, the host server 200 starts a command request process for the storage system 1 within the range of the in-capsule data size upper limit sent in S3.

According to the method described above, it is possible to realize the number of connections and a communication buffer size optimized for the requirements of the host server 200 and the configuration of the storage system 1 in the storage system 1 utilizing the smart NIC. In a case where this method is used, the necessary and sufficient number of connections and communication buffer amount are allocated to a connection between the host server 200 and the storage system 1. As a result, it is possible to reduce memory consumption of the smart NIC while curbing performance degradation.

In the drawing, more communication buffers 141 are allocated with a small number of IO connections to the host server 200-A having a low performance requirement and a long distance from the storage system 1 via WAN coupling. On the other hand, a smaller communication buffer 141 is allocated with a large number of IO connections to the host server 200-B having a high performance requirement and a short distance from the storage system 1 via LAN coupling.

In the present embodiment, the number of IO connections and a communication buffer amount of in-capsule data are assumed as parameters for connection control, but this is merely an example. The present invention is also applicable to other parameters for connection control between the host server 200 and the storage system 1. For example, the present invention can be applied to a reception buffer amount, a transmission buffer amount, and the like of a TCP connection of the FE I/F 110.

In the present embodiment, NVMe/TCP is assumed as a communication protocol between the host server 200 and the storage system 1, but the communication protocol is not limited thereto. For example, the present disclosure is also applicable to communication protocols such as iSCSI, NVMe/Remote Direct Memory Access (RDMA), Fibre Channel Small Computer System Interface (FC-SCSI), and FC NVMe.

System Configuration of First Embodiment

Figure 2:
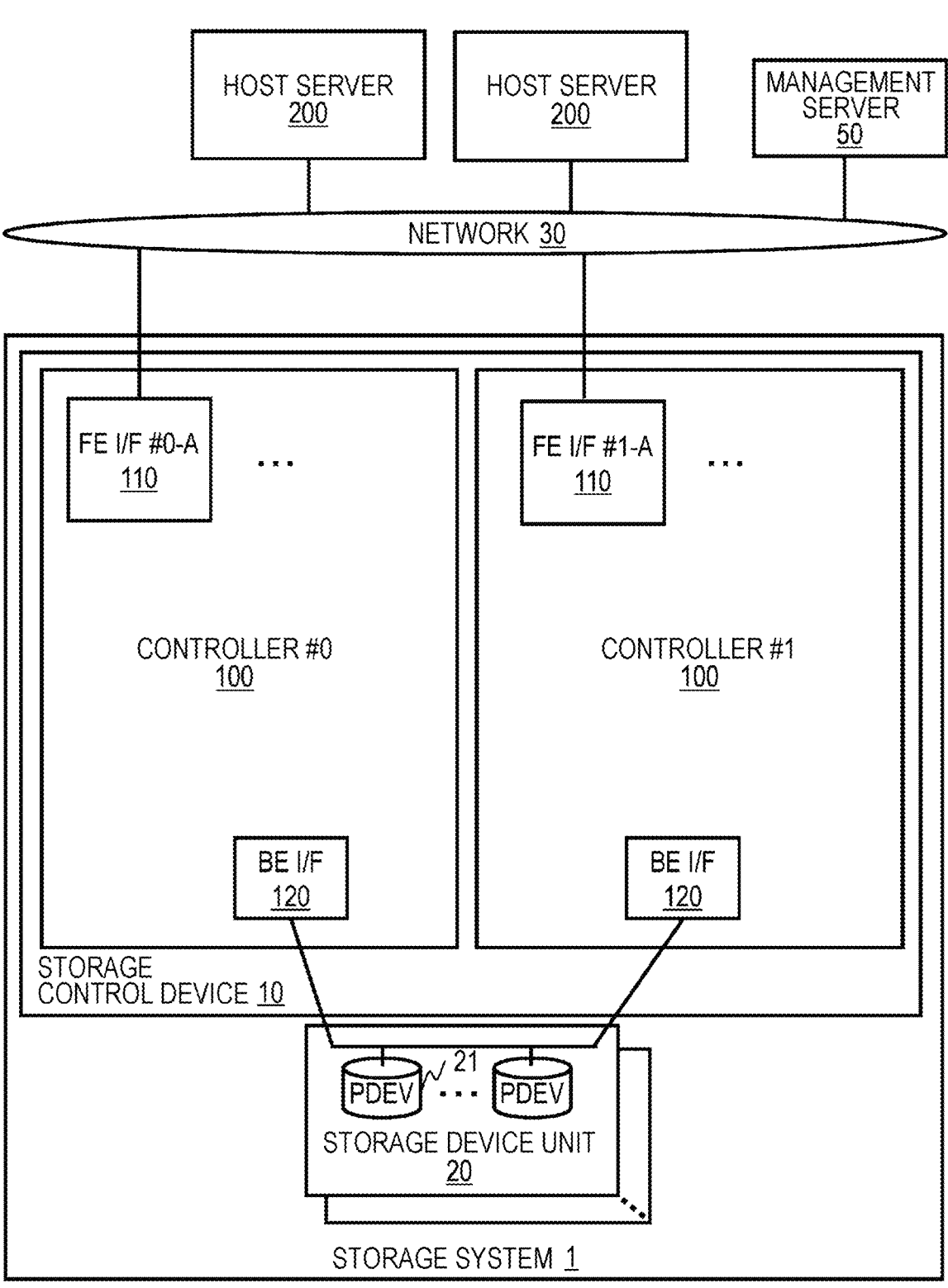
FIG. 2 is a diagram illustrating an example of an overall configuration of the storage system of the first embodiment.

FIG. 2 is an overall configuration diagram of the storage system 1 of the first embodiment.

The storage system 1 is coupled to the host server 200 and a management server 50 via a network 30.

The storage system 1 includes a storage control device 10 and a storage device unit 20. The storage control device 10 includes a plurality of controllers 100. In order to improve the availability of the storage system 1, a dedicated power supply may be prepared for each controller 100, and power may be supplied to each controller 100 by using the dedicated power supply. In addition, there may be a plurality of storage control devices 10, and the controllers 100 may be coupled to each other via a host channel adaptor (HCA) network.

The controller 100 includes an FE I/F 110 and a BE I/F 120.

The storage device unit 20 includes a plurality of PDEVs 21. The PDEV 21 uses a hard disk drive (HDD) or another type of storage device (nonvolatile storage device), for example, a flash memory (FM) device such as a solid state drive (SSD). The storage device unit 20 may have different types of PDEVs 21. In addition, a RAID group may be configured by a plurality of PDEVs 21 of the same type. Data is stored in the RAID group according to a predetermined RAID level.

The network 30 is, for example, a local area network (LAN) or a wide area network (WAN).

The host server 200 is a device that accesses the storage system 1, and transmits a data input/output request (a data write request and a data read request) to the storage system 1. The host server 200 transmits a data input/output request in units of blocks to the storage system 1.

The management server 50 includes a user interface such as a graphical user interface (GUI) or a command line interface (CLI), and provides a function for a user or an operator to control and monitor the storage system 1.

Figure 3:
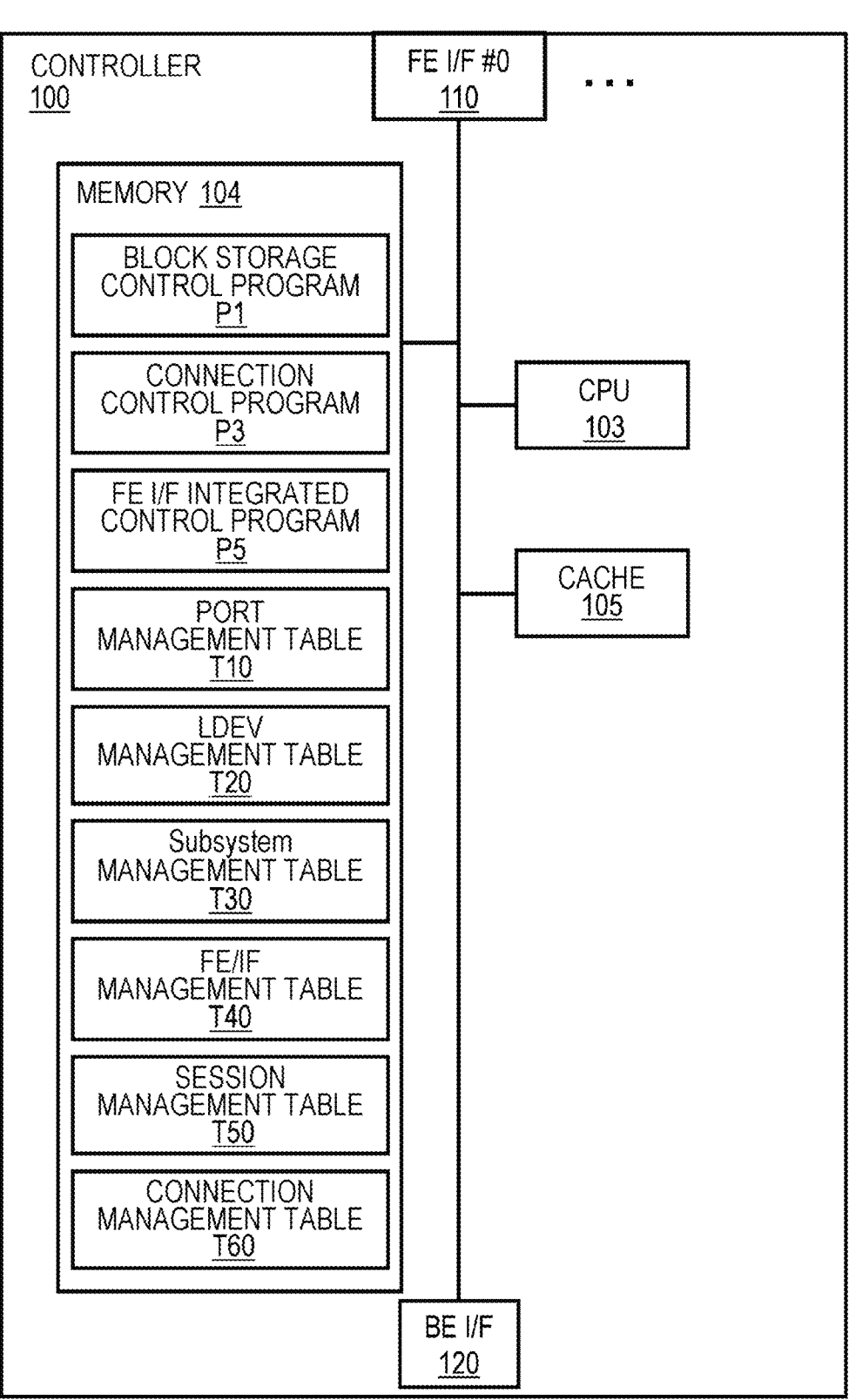
FIG. 3 is a diagram illustrating an example of a controller configuration of the storage system of the first embodiment.

FIG. 3 is a configuration diagram of the controller 100 of the storage system 1 of the first embodiment.

The controller 100 includes an FE I/F 110, a BE I/F 120, a CPU 103, a memory 104, and a cache 105. These are coupled to each other via a communication path such as a bus.

The FE I/F 110 is a programmable network interface using a smart NIC or the like. In the first embodiment, block protocol processing operates on the FE I/F 110. The FE I/F 110 will be described later in detail with reference to FIG. 4. The BE I/F 120 is an interface device for the controller 100 to communicate with the storage device unit 20. The FE I/F 110 stores subsystem data in the storage device unit 20.

The CPU 103 controls an operation of the block storage. The memory 104 is, for example, a random access memory (RAN), and temporarily stores a program and data used for operation control of the CPU 103. The memory 104 stores a block storage control program P1, a connection control program P3, an FE I/F integrated control program P5, a port management table T10, an LDEV management table T20, a subsystem management table T30, an FE I/F management table T40, a session management table T50, and a connection management table T60. Programs and tables stored in the memory 104 may be stored in the storage device unit 20.

The block storage control program P1 configures a namespace from a logical device (LDEV) that is a logical storage region based on the storage device unit 20 and a subsystem that is a set of namespaces and provides the namespace and the subsystem to the FE I/F 110. The FE I/F 110 can access any LDEV by designating the subsystem and the namespace. As a result, the FE I/F 110 can use the LDEV as a storage destination of the subsystem and the namespace to be provided to the host server 200.

The connection control program P3 is a program for controlling a connection between the host server 200 and the FE I/F 110. When an inquiry about a connection configuration is received from the FE I/F to the host server 200, the connection control program P3 calculates the number of IO connections, an in-capsule data size upper limit, and a communication buffer amount based on an algorithm that will be described later with reference to FIGS. 13 to 15, and gives a response.

The FE I/F integrated control program P5 controls all the FE I/Fs 110 of the controller 100. The FE I/F integrated control program P5 turns on and activates the FE I/F 110, and initializes the FE I/F 110 through an internal bus, thereby making it possible to accept data access from the host server 200. All the controllers 100 of the storage system 1 can synchronize the tables and access the tables having the same content.

Details of the various tables will be described later with reference to FIGS. 7 to 12. The cache 105 temporarily stores write data from the host server 200 or the FE I/F 110 and data read from the storage device unit 20.

Figure 4:
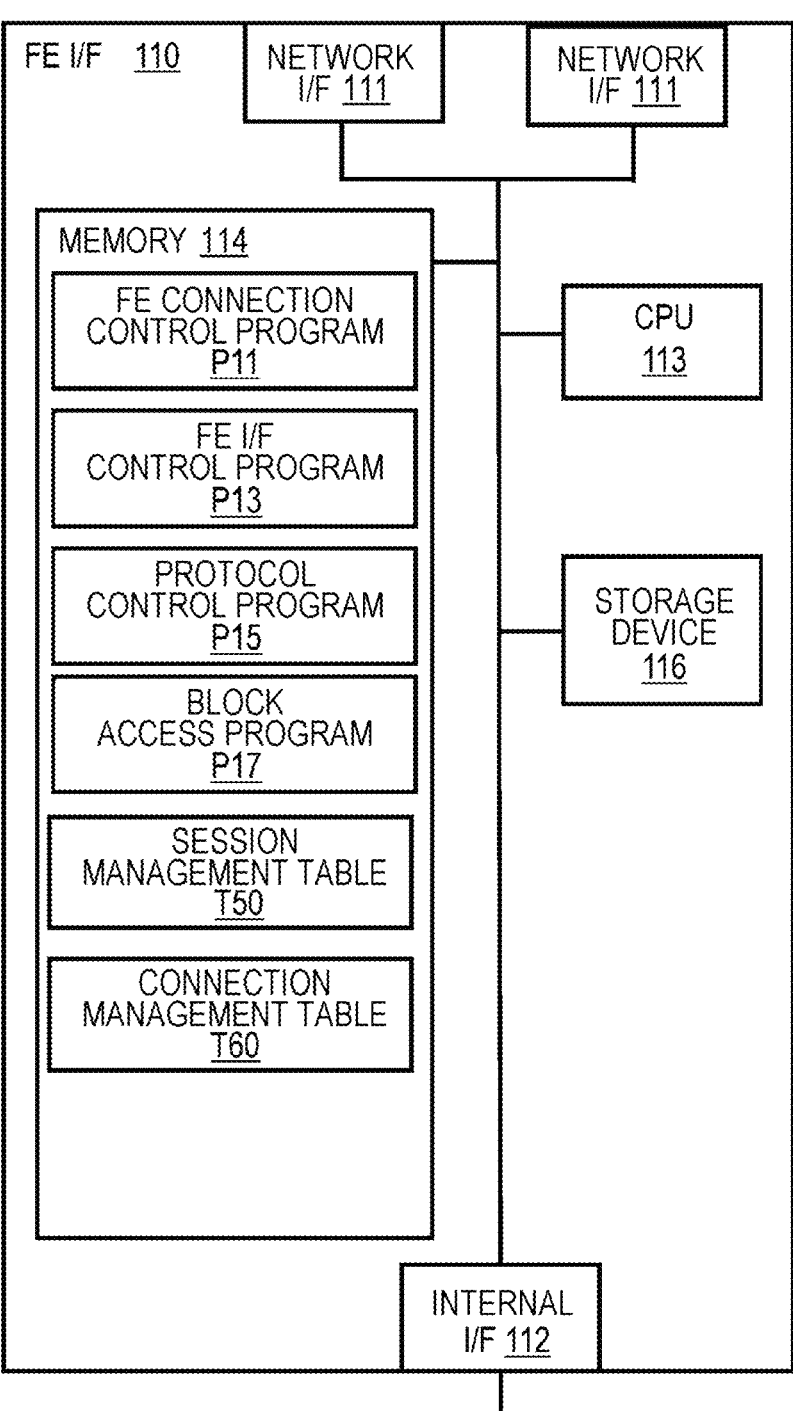
FIG. 4 is a diagram illustrating an example of an FE I/F configuration of the storage system of the first embodiment.

FIG. 4 is a configuration diagram of the FE I/F 110 of the storage system 1 of the first embodiment.

The FE I/F 110 includes a network I/F 111, an internal I/F 112, a CPU 113, a memory 114, and a storage device 116. These are coupled to each other via a communication path such as a bus.

The network I/F 111 is an interface device for communicating with the host server 200. An IP address is set in the network I/F 111 and is used as a network port (hereinafter referred to as a port) for communication. The IP address is an identifier on the network, and the host server 200 communicates with the FE I/F 110 through the IP address set in the port.

The internal I/F 112 is an interface device that communicates with the controller 100. The internal I/F 112 is coupled to a CPU or the like of the controller 100 by, for example, Peripheral Component Interconnect-Express (PCIe).

The CPU 113 controls an operation of the FE I/F 110. The memory 114 temporarily stores programs and data used for operation control of the CPU 113. The memory 114 stores an FE connection control program P11, an FE I/F control program P13, a protocol control program P15, a block access program P17, a session management table T50, and a connection management table T60. Each program and information stored in the memory 114 may be stored in the storage device 116.

The FE connection control program P11 is executed by the CPU 113 to control a connection for communication between the host server 200 and the storage system 1 and a session including one or more connections. In the present embodiment, a Transmission Control Protocol/Internet Protocol (TCP/IP) connection is assumed as a connection type, and an NVMe/TCP session is assumed as a session. The FE connection control program P11 configures, for each port of the FE I/F 110, a TCP port for a listen service that accepts a connection establishment request. The FE connection control program P11 establishes a TCP connection when receiving a connection establishment request for the listen service. Thereafter, an acceptance session for the session establishment request from the host server is established.

The FE I/F control program P13 is an operating system (OS) of the FE I/F 110, and communicates with the controller 100 to perform initialization, resource management, failure management, and task scheduling of the FE I/F 110.

The protocol control program P15 receives various requests such as read/write from the host server 200 or the like, and processes a block protocol included in the requests. The protocol control program P15 processes a block access protocol such as NVMe/TCP received from the host server 200 and converts the block access protocol into a block access command request to the controller 100. The block access program P17 communicates with the controller 100 and processes data writing and reading for an LDEV configuring the namespace of the subsystem. The FE I/F control program P13 cooperates with the FE I/F integrated control program P5 to synchronize the tables in the memory 114 with the tables in the controller. The storage device 116 stores programs, tables, and the like of the FE I/F 110.

Figure 5:
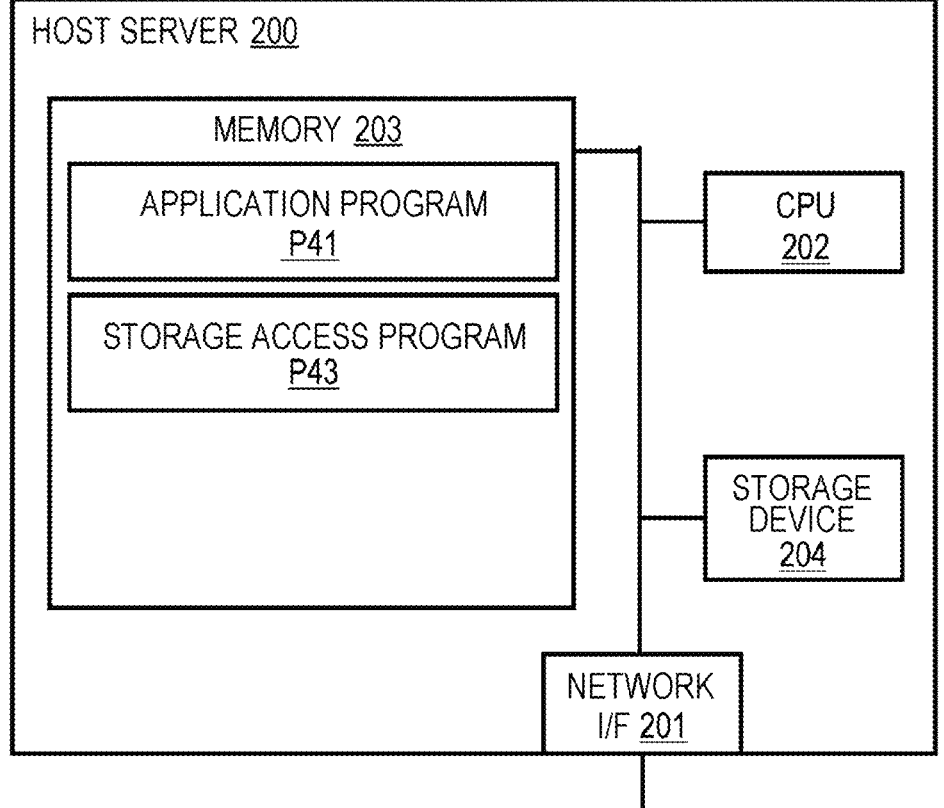
FIG. 5 is a diagram illustrating an example of a host server configuration of the storage system of the first embodiment.

FIG. 5 is a diagram illustrating an example of a configuration of the host server 200 of the first embodiment. The host server 200 includes a network I/F 201, a CPU 202, a memory 203, and a storage device 204. These are coupled to each other via a communication path such as a bus.

The network I/F 201 is an interface device for communicating with the storage system 1 and the management server 50. The CPU 202 controls an operation of the host server 200. The memory 203 temporarily stores a program and a table used for operation control of the CPU 202. The memory 203 stores an application program P41 and a storage access program P43. Each program and information stored in the memory 43 may be stored in the storage device 44.

The storage device 204 stores programs and tables of the host server 200.

The application program P41 is executed by the CPU 202 to read and write data into and from the namespace of the subsystem provided by the storage system 1 via the storage access program P43. The storage access program P43 receives various requests such as read/write from the application program P41 and reads/writes data from/into the storage system 1. The storage device 44 stores programs and tables of the host server 200.

Figure 6:
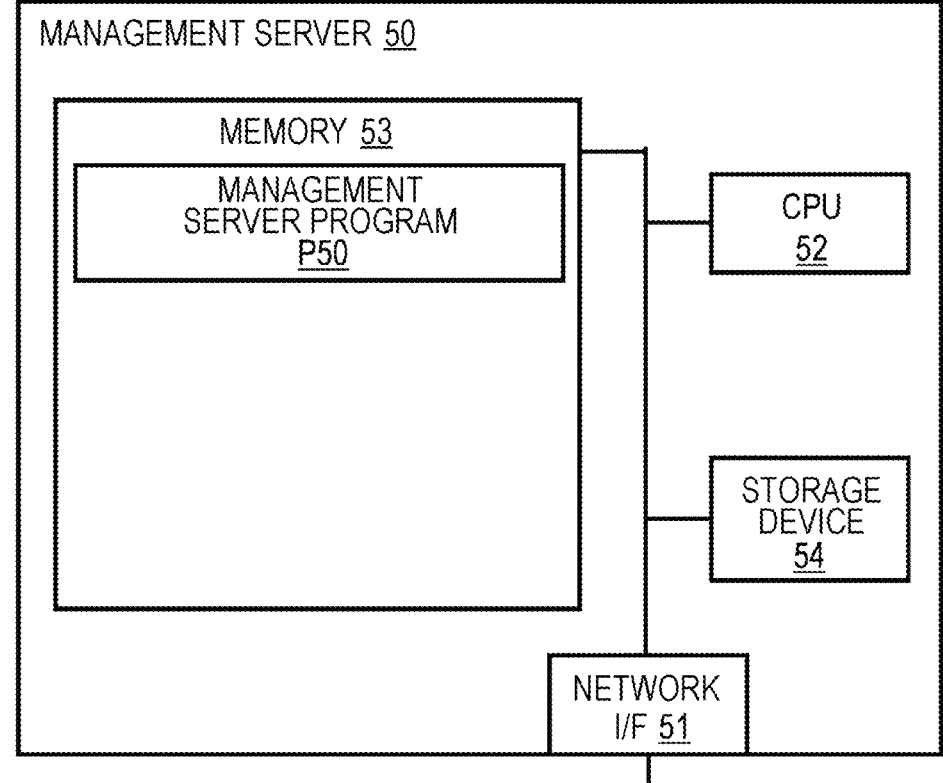
FIG. 6 is a diagram illustrating an example of a management server configuration of the storage system of the first embodiment.

FIG. 6 is a diagram illustrating an example of a configuration of the management server 50 of the first embodiment. The management server 50 includes a network I/F 51, a CPU 52, a memory 53, and a storage device 54. These constituents are coupled to each other via a communication path such as a Peripheral Component Interconnect Express (PCI Express) bus.

The network I/F 51 is an interface device for communicating with the storage system 1 and the host server 200.

The CPU 52 controls an operation of the management server 50. The memory 53 temporarily stores programs and data used for operation control of the CPU 52. The memory 53 stores a management server program P50. Each program and information stored in the memory 53 may be stored in the storage device 54. The storage device 54 stores programs and tables of the management server 50.

The management server program P50 includes a user interface such as a GUI or a CLI, and provides a function for a user or an operator to control and monitor the storage system 1. When receiving a control instruction or a monitoring instruction for the storage system 1 from the user, the management server program P50 communicates with the storage system 1 to perform control or monitoring.

Tables of First Embodiment

FIG. 7 is a diagram illustrating an example of the port management table T10.

The port management table T10 is a management table used for the controller 100 to manage ports set in the storage system 1.

Each row of the port management table T10 indicates a configuration of each port of the storage system 1. The port management table T10 includes a port ID C101, a controller ID C102, an FE I/F ID C103, an IP address C104, and a protocol type C105.

The port ID C101 stores an identifier of the corresponding port in the storage system 1.

The controller ID C102 stores an identifier of the controller 100 to which the port belongs. The FE I/F ID C103 stores an identifier of the FE I/F 110 having the port.

The IP address C104 stores the IP address set in the corresponding port.

The protocol type C105 stores the protocol type set in the corresponding port. Examples of the protocol type include "NVMe/TCP", "FC NVMe", "iSCSI", and "FC SCSI", but are not limited thereto.

FIG. 8 is a diagram illustrating an example of the LDEV management table T20.

The LDEV management table T20 is a management table used for the controller 100 to manage an LDEV. Each row of the LDEV management table T20 indicates a configuration of the LDEV managed by the storage system 1. In all the controllers 100 of the storage system 1, a controller in charge is allocated for each LDEV, and the controller 100 that processes the LDEV can be changed by changing the controller in charge.

The LDEV management table T20 includes an LDEV ID C201, a controller in charge C202, a use PDEV C203, and a capacity C204. The LDEV ID C201 stores an identifier of the corresponding LDEV. The controller in charge C202 stores an identifier of a controller in charge of the corresponding LDEV. The use PDEV C203 stores an identifier of a PDEV that stores data of the LDEV. The capacity C204 stores a capacity of the corresponding LDEV.

In the present embodiment, the LDEV has a one-to-one correspondence with the PDEV, but this is merely an example. For example, as in the thin provisioning function, it may also be possible to create a large-capacity pool from one or more PDEVs and virtually cut out a necessary capacity to obtain LDEV having the capacity.

FIG. 9 is a diagram illustrating an example of the subsystem management table T30. The subsystem management table T30 is a management table used for the controller 100 to manage the subsystem. Each row of the subsystem management table T30 indicates a configuration of the subsystem managed by the storage system 1.

The host server 200 can access the corresponding subsystem by using the communication protocol stored in the protocol type C105 of the port management table T10. The host server 200 exclusively uses the subsystem, and one host server 200 basically occupies one subsystem.

The subsystem management table T30 includes a subsystem ID C301, a subsystem NQN C302, a port ID C303, a host NQN C304, a host performance requirement C305, a host OS C306, a namespace number C307, an LDEV C308, an IO queue length C309, and an application C310.

The subsystem ID C301 stores an identifier of the corresponding subsystem in the storage system 1. The subsystem NQN C302 is an NVMe qualified name (NQN) which is an identifier of the subsystem in the NVMe/TCP protocol. The host server 200 designates the subsystem that is a connection establishment destination by using the subsystem NQN. The port ID C303 stores an identifier of a port that discloses the subsystem.

The host NQN C304 is an NQN which is an identifier of the host server 200 in the NVMe/TCP protocol. The storage system 1 determines whether coupling to the subsystem is performed based on the host NQN. The host NQN C304 is set by a storage administrator by using a management GUI that will be described later with reference to FIG. 17.

The host performance requirement C305 is a performance requirement of the host server 200 using the subsystem, and stores values of "maximum", "high", "medium", and "low". The host performance requirement C305 is set by the storage administrator by using a management graphical user interface (GUI) that will be described later with reference to FIG. 17.

The host OS C306 is the type of operating system (OS) of the host server 200 using the subsystem, and stores values such as "Ubuntu Linux 20.04" (registered trademark for Linux) and "Windows 11" (registered trademark for Windows). The host OS C306 is set by the storage administrator by using a management GUI that will be described later with reference to FIG. 17.

The namespace number C307 is a number of a namespace included in the subsystem, and sequentially stores an integer starting from 0 for each subsystem. The LDEV C308 stores an identifier of one LDEV configuring one namespace with the namespace number C307. In each subsystem, the namespace and the LDEV correspond one-to-one.

The IO queue length C309 indicates a length of an IO queue for each IO connection of the host server 200 and is represented by the number of commands. The host server 200 can simultaneously issue a Read/Write command corresponding to the IO queue length to the storage system 1 for each IO connection. The IO queue length is determined for each host OS, and is set for each host OS type set by the user. That is, one IO queue length is set for each subsystem.

The application C310 stores an application of the subsystem. The application C310 designates "LAN access", "WAN access", "remote backup", and the like. The application C310 is set by the storage administrator by using a management GUI that will be described later with reference to FIG. 17.

The setting of the host performance requirement C305, the host OS C306, and the application C310 by the storage administrator using the management GUI is merely an example. Alternatively, the setting may be performed by using a command line interface (CLI) or a REST I/F. In addition, the storage system 1 may perform automatic determination from an IO trace of the host server 200 without being set by the storage administrator.

FIG. 10 is a diagram illustrating an example of the FE I/F management table T40.

The FE I/F management table T40 is used for the controller 100 to manage the FE I/F 110 mounted on the storage system 1.

Each row of the FE I/F management table T40 indicates a configuration of the FE I/F 110 mounted on the storage system 1. The controller 100 manages the configuration of the FE I/F by using the FE I/F management table T40.

The FE I/F management table T40 includes an FE I/F ID C401, a mounting controller C402, the number of ports C403, the number of CPU cores C404, a memory capacity C405, an IOPS C406, and a 1IO processing time C407.

The FE I/F ID C401 stores an identifier of the corresponding FE I/F 110. The mounting controller C402 stores an identifier of the controller 100 on which the corresponding FE I/F 110 is mounted.

The number of ports C403 stores the number of network I/Fs 111 of the corresponding FE I/F 110. The number of CPU cores C404 stores the number of CPU cores of the CPU 113 of the corresponding FE I/F 110. The number of CPU cores mentioned here represents the number of processors built in the CPU. As the number of CPU cores increases, the CPU can perform parallel processing. The FE I/F 110 allocates the allocated CPU for each IO connection and distributes the load on the CPU core in units of connections. The memory capacity C405 stores a memory capacity of the memory 114 of the corresponding FE I/F 110.

The IOPS C406 stores input/output per second (IOPS) per port of the corresponding FE I/F 110. The IOPS C406 stores IOPS per port evaluated in advance by a development vendor. The IOPS mentioned here is one of storage performance indices, and indicates the number of times reading and writing can be performed in one second under a certain condition. The 1IO processing time C407 stores a processing time (IO processing unit time) per IO of the corresponding FE I/F 110. The 1IO processing time C407 stores a time required to process 1IO evaluated in advance by the development vendor. The IOPS C406 and the 1IO processing time C407 are information indicating communication performance between the host server 200 and the FE I/F 110.

FIG. 11 is a diagram illustrating an example of the session management table T50. Each row of the session management table T50 indicates a configuration of a session. The session management table T50 is used for the controller 100 and the FE I/F 110 to manage a session with the host server 200. Each FE I/F 110 manages the session management table T50 for a session managed by itself. The controller 100 synchronizes with all the FE I/Fs 110 and manages all the sessions of the storage system 1 in the session management table T50.

The session management table T50 stores a host NQN C501, a host ID C502, a port ID C503, a subsystem NQN C504, a session number C505, an IO connection number upper limit C506, a communication buffer amount C507, an in-capsule data size upper limit C508, an IO queue length C509, and an RTT C510.

The host NQN C501 is an identifier of the host server 200 in the NVMe/TCP protocol. The host ID C502 is an identifier on the host side in the NVMe/TCP protocol, and is allocated to an adapter of the host server 200. The host ID C502 is used when the host server is coupled to the storage system 1.

The port ID C503 is an identifier of a port used by the corresponding session. The subsystem NQN C504 is an identifier of a connection establishment destination subsystem of the session. The session number C505 is an identifier of a establishment session. The controller 100 numbers established sessions for each port in ascending order from 0. The IO connection number upper limit C506 is an upper limit of the number of IO connections in the corresponding session permitted for the session.

The communication buffer amount C507 is a communication buffer size for storing in-capsule data. The communication buffer amount C507 is a product of the in-capsule data size upper limit C508 and the IO queue length C509.

The in-capsule data size upper limit C508 is an upper limit of the size of the in-capsule data. The storage system 1 notifies the host server 200 of the in-capsule data size upper limit C508 as a response to the session establishment request, and makes an error response when receiving in-capsule data with a size equal to or larger than the upper limit.

The IO queue length C509 is an IO queue length of the host server 200. The storage system 1 sets this value based on a host OS type set in advance. The RTT C510 is an RTT between the storage system 1 and the host server 200. In the storage system 1, a method of setting an RTT will be described later with reference to FIG. 13.

FIG. 12 is a diagram illustrating an example of the connection management table T60. The connection management table T60 is used for the controller 100 and the FE I/F 110 to manage connections. The connection mentioned here is a data communication path of the TCP protocol, and is a data communication path between the host server 200 and the storage system 1. Each row of the connection management table T60 corresponds to a connection between the host server and the storage system.

The connection management table T60 stores a host IP address C601, a host port number C602, a port ID C603, a target IP address C604, a target port number C605, a session number C606, a connection number C607, and a connection type C608.

The host IP address C601 is an IP address used by the host server 200 of the corresponding connection. The host port number C602 is a port number used by the host server 200 of the corresponding connection. The port ID C603 is an identifier of a port used by the corresponding connection.

The target IP address C604 is an IP address used by the storage system 1 of the corresponding connection. The target port number C605 is a port number used by the storage system 1 of the connection. The session number C606 is a number of a session to which the corresponding connection belongs. The session number is an identifier of a session for each port.

The connection number C607 is an identifier of a corresponding connection in the same session. The connection type C608 indicates the type of the corresponding connection, and stores "management" or "IO".

Flowchart of First Embodiment

FIG. 13 is a flowchart illustrating an example of a session establishment process of the host server 200 and the storage system 1 of the first embodiment. The host server 200 establishes a session with respect to the subsystem provided by the storage system 1, and starts communication of a management command and an IO command for data access.

The storage access program P43 of the host server 200, the FE connection control program P11 and the protocol control program P15 of the FE I/F 110, and the connection control program P3 of the controller 100 establish a session between the host server 200 and the subsystem in the flow illustrated in FIG. 13.

S1000: The storage access program P43 of the host server 200 transmits a TCP connection establishment request to a connection establishment destination port of the FE I/F 110.

S1020: When receiving the TCP connection establishment request in S1000, the FE connection control program P11 of the FE I/F 110 establishes a TCP connection with the host server 200.

S1030: The FE connection control program P11 of the FE I/F 110 responds to the TCP connection establishment request of the host server 200. In this case, the FE connection control program P11 records the time at the time of response transmission in an on-memory.

S1040: The host server 200 that has received the TCP establishment request response transmits a protocol data unit (PDU) of the administrative connection establishment request to the FE I/F 110. The administrative connection establishment request requests the storage system 1 to use the TCP connection established in S1020 as a administrative connection of NVMe/TCP. The PDU of the administrative connection establishment request includes a host NQN, a host ID, and a subsystem NQN.

S1050: When receiving the PDU of the administrative connection establishment request, the FE connection control program P11 of the FE I/F 110 interprets the PDU and acquires the host NQN, the host ID, and the subsystem NQN. In addition, an RTT between the host server 200 and the storage system 1 is calculated from a difference between a time at the time of transmitting the response recorded in S1030 and the current time, and is recorded in the session management table T50.

S1060: The FE connection control program P11 of the FE I/F 110 transmits a session establishment request to the controller 100. In this case, the host NQN, the host ID, the subsystem NQN, the port ID, and the RTT are sent.

S1070: The connection control program P3 of the controller 100 calculates the number of connections of the target session. Details of the IO connection calculation will be described later with reference to FIG. 14.

S1080: The connection control program P3 of the controller 100 calculates a communication buffer amount and an in-capsule data size upper limit of the target session. Details of the calculation of a communication buffer amount will be described later with reference to FIG. 15.

S1090: The connection control program P3 of the controller 100 secures a session resource in the controller 100 and updates the session management table T50 and the connection management table T60.

S1100: The connection control program P3 of the controller 100 gives a response to the FE/IF. In this case, the number of IO connections, the communication buffer amount, and the in-capsule data size upper limit calculated in S1070 and S1080 are sent together.

S1110: The FE connection control program P11 of the FE I/F 110 instructs the protocol control program P15 to establish an administrative connection with the host server 200. Thereafter, the FE connection control program P11 updates the session management table T50 and the connection management table T60. The content of the session management table T50 and the connection management table T60 is equivalent to that of the controller 100.

S1120: The FE connection control program P11 of the FE I/F 110 responds to the administrative connection establishment request of the host server 200. The response to the administrative connection establishment request includes the number of IO connections and the in-capsule data size upper limit.

The processes from S1130 to S1190 are repeatedly performed for the number of IO connections calculated in S1070.

S1140: The host server 200 transmits a TCP connection establishment request for an IO connection to the storage system 1, and establishes a TCP connection. Thereafter, the host server 200 transmits an IO connection establishment request to the FE I/F 110.

S1150: After receiving the IO connection establishment request, the FE connection control program P11 of the FE I/F 110 transmits the IO connection establishment request to the controller 100.

S1160: After the IO connection is established, the controller 100 updates the connection management table T60 and gives a response to the FE I/F 110.

S1170: The FE connection control program P11 of the FE I/F 110 secures the communication buffer amount calculated in S1100 for the IO connection, and establishes the IO connection. Thereafter, the FE connection control program P11 updates the connection table.

S1180: The FE connection control program P11 of the FE I/F 110 returns a response to the host server 200.

S1190: The processes in and after S1130 are repeatedly performed for the number of IO connections.

As described above, in the first embodiment, the FE I/F 110 that performs protocol processing instructs the controller to calculate the number of IO connections and a communication buffer amount at the time of a session establishment request from the host server 200. The controller 100 calculates the necessary and sufficient number of IO connections and communication buffer amount based on the requirements of the host server registered in advance and the configuration of the storage system 1, thereby realizing a memory use amount maintaining the performance.

FIG. 14 is a flowchart illustrating an example of IO connection number calculation process performed by the connection control program P3 of the controller 100 of the first embodiment. The connection control program P3 calculates the number of IO connections in the session to be established in the flow illustrated in FIG. 14.

S1070-1: The connection control program P3 acquires the number of subsystems using the FE I/F 110 for establishing a session from the subsystem management table T30. The number of subsystems is equivalent to the number of coupled hosts. In the subsystem using the FE I/F 110, any of the ports ID C303 is a subsystem included in the FE I/F 110.

The connection control program P3 acquires the performance requirement C305 and the IO queue length C309 of the subsystem corresponding to the subsystem NQN designated by the FE I/F 110 from the subsystem management table T30. In addition, the connection control program P3 acquires the number of ports C403, the number of CPU cores C404, the IOPS C406, and the 1 IO processing time C407 of the FE I/F 110 to be used from the FE I/F management table T40.

S1070-2: The connection control program P3 calculates the minimum number of IO connections according to the following formula.

$$\text{Minimum number of IO connections} = \text{number of CPU cores/number of ports}$$

As will be described later, the minimum number of IO connections indicates the minimum value of the connection upper limit number allowed in the session. The FE I/F 110 assumed in the present embodiment processes the IO connections in a distributed manner between the CPU cores. By making the number of IO connections equal to or larger than the number of CPU cores allocated to each port, it is possible to further equalize loads between the CPU cores.

S1070-3: The connection control program P3 calculates a host performance requirement from the following formula.

The host performance requirement mentioned here is IOPS to be achieved in the session.

$$\text{Number of necessary } IO \text{ connections } =$$
$$\text{host performance requirement} \times 1 IO \text{ processing time}/IO \text{ queue length}$$

The performance coefficient mentioned here is a coefficient determined by the host performance requirement C305, and is 0.5 in the case of low, 1 in the case of medium, 4 in the case of high, and 8 in the case of maximum.

S1070-4: The connection control program P3 calculates the necessary number of IO connections by using the following formula. The product of the required number of IO connections and the queue length of each IO connection mentioned here is equivalent to the IO parallelism required to achieve the host performance requirement. The IO parallelism indicates the number of commands that can be simultaneously transmitted from the host server 200 to the storage system 1 without a response to IO.

$$\text{Host performance requirement } =$$
$$IOPS/\text{number of subsystems} \times \text{performance coefficient}$$

S1070-5: The connection control program P3 sets a larger one of the minimum number of IO connections and the necessary number of IO connections as an upper limit of the number of IO connections. As a result, IOPS per session can be made equal to or higher than IOPS of the host performance requirement.

As described above, in the first embodiment, it is possible to realize a necessary and sufficient number of connections from the host requirement managed in the subsystem management table T30 and the performance value and the hardware configuration of the FE I/F 110 managed in the FE I/F management table T40 by the controller 100.

Note that the connection number calculation method described above is merely an example. For example, the number of connections per host server 200 may be dynamically determined from a statistical value of the memory use amount of the FE I/F 110. In addition, the IO parallelism may be increased by setting a larger number of connections to a host server at a remote location with a large communication delay.

FIG. 15 is a flowchart illustrating an example of a communication buffer calculation process performed by the connection control program P3 of the controller 100 according to the first embodiment. The connection control program P3 calculates an upper limit of the in-capsule data size and a communication buffer size of the IO connection in the session in the flow illustrated in FIG. 15.

S1080-1: The connection control program P3 acquires the IO queue length C309 and the application C310 from the subsystem management table T30. In a case where the RTT sent by the FE I/F is more than 1 ms or in a case where the application is remote communication between remote locations (different sites or the like) such as "WAN access" or "remote backup", the connection control program P3 proceeds to S1080-2. Remote communication has a longer communication delay time than local communication. Otherwise, the process proceeds to S1080-3.

S1080-2: The connection control program P3 calculates an in-capsule data size upper limit by using the following formula.

$$\text{In-capsule data size upper limit} = 8 \ KB \times 2^{\wedge} SQRT(RTT/1 \text{ ms})$$

S1080-3: The connection control program P3 sets the in-capsule data size upper limit to 8 KB.

S1080-4: The connection control program P3 calculates a communication buffer size for the in-capsule data from the following formula.

$$\text{Communication buffer size } =$$
$$\text{in-capsule data size upper limit} \times IO \text{ queue length}$$

As described above, in the first embodiment, the communication buffer amount for the host server 200 far from the storage system 1 is increased, and communication of larger data can be performed as in-capsule data. As a result, the number of times of communication is reduced, and the performance influence due to the communication delay is reduced.

Note that the communication buffer calculation method described above is merely an example. For example, the amount of communication buffer per host server 200 may be dynamically determined from the memory use status of the FE I/F 110.

FIG. 16 is a flowchart illustrating an example of a session re-establishment process between the host server 200 and the subsystem provided by the storage system 1 according to the first embodiment.

In the first embodiment, the number of IO connections per host server 200 is determined according to the number of subsystems. In a case where the number of subsystems of the storage system 1 increases during operation, the number of host servers 200 to be coupled increases, and in a case where the IO connection that is already coupled is continuously used without any change, there is a possibility that a memory shortage occurs. Therefore, in a case where the FE I/F 110 detects the memory shortage, a process of reestablishing a session with the host server 200 in which allocation of the number of IO connections has been changed and reestablishing the session in the number of IO connections corresponding to a configuration at that time is performed.

S2000: The FE I/F control program P13 of the FE I/F 110 detects a memory shortage in a case where a free memory capacity of the FE I/F 110 becomes equal to or less than a threshold.

S2010: The FE I/F control program P13 notifies the controller 100 of a memory shortage failure.

S2020: The FE I/F integrated control program P5 of the controller 100 checks an expected value of the number of IO connections per host server 200 based on the session management table T50 and the subsystem management table T30. The connection management table T60 is checked by the FE I/F integrated control program P5 to check the number of IO connections currently coupled.

S2030: The FE I/F integrated control program P5 of the controller 100 instructs the FE I/F 110 to reestablish a session having a difference between the number of established IO connections and an expected value of the number of IO connections.

S2040: The FE connection control program P11 of the FE I/F 110 performs a session disconnect process on the host server 200 established to the session.

S2050: The FE I/F 110 restarts the programs.

S2060: The host server 200 from which the session is disconnected performs the session establishment process illustrated in FIG. 13 again. As a result, reestablishment is performed in the number of IO connections corresponding to the host server configuration at that time.

As described above, in the first embodiment, in a case where the number of subsystems increases during operation, the session is reestablished to make the IO connection per host server 200 appropriate. As a result, even when the configuration of the system changes, the system can be operated in an appropriate number of connections. In addition, the number of hosts that can be coupled per FE I/F increases, and reduction in CAPEX/OPEX and power saving due to reduction in the number of devices can be realized.

Note that only one of the number of IO connections and the buffer size may be determined. The host performance requirement does not need to be referred to in the determination of the number of IO connections, and one of information indicating a communication distance such as the RTT and a communication application does not need to be referred to in the determination of the buffer size.

User Interface of First Embodiment

FIG. 17 is a diagram illustrating an example of a subsystem setting interface of the storage system of the first embodiment.

The management server program P50 of the management server 50 provides a user with operation means for creating and changing a configuration of a subsystem via a subsystem setting interface I1.

The subsystem setting interface I1 includes a subsystem NQN input I10, a namespace input I20, a port input I30, a host NQN input I40, a host performance requirement input I50, a host OS input I60, a host application input I70, a determination button 180, and a cancel button 190.

The subsystem NQN input I10 is a text box for inputting a subsystem NQN of the subsystem that is an operation target.

The namespace input I20 is a table of a drop-down list for designating LDEVs configuring the namespace of the subsystem.

The port input I30 is a table with a check box for designating a port at which the subsystem is disclosed.

The host NQN input I40 is a text box for inputting an NQN of the host server 200 using the subsystem.

The host performance requirement input I50 is a drop-down list for inputting a performance requirement of the host server 200 using the subsystem.

The host OS input I60 is a drop-down list for inputting the OS of the host server 200 using the subsystem.

The host application input I70 is a drop-down list for inputting an application of the host server 200 using the subsystem.

The determination button 180 is an interface for giving an instruction to create the subsystem and change a configuration of the subsystem based on the input content.

The cancel button 190 is an interface for canceling creation and configuration change of the subsystem in the input content.

As described above, in the first embodiment, the performance requirements, the OS, and the application of the host server 200 using the subsystem can be set by using the GUI. The controller 100 can calculate a parameter value of an appropriate connection by using these set values.

Note that the FE I/F 110 may execute at least some of the processes executed by the controller 100 in the present embodiment. In this case, the FE I/F 110 may acquire information necessary for the processes from the controller 100.

Second Embodiment

In a second embodiment, a conventional block storage is assumed. In the second embodiment, when a storage system using a normal NIC receives a session establishment request from a host server, a memory consumption amount is reduced while maintaining the performance by changing the number of connections or a communication buffer capacity according to a performance requirement of the host server, a distance to the storage system, and a configuration of the storage system. The second embodiment is different from the first embodiment in that the storage system 1 does not offload the protocol processing to the smart NIC, and the controller 100 performs the protocol processing.

Hereinafter, a difference between the second embodiment and the first embodiment will be described with reference to FIG. 18.

FIG. 18 is a schematic diagram of the second embodiment. The second embodiment is different from the first embodiment in that a normal NIC is used for the FE I/F 110 instead of a smart NIC. The controller 100 operates the protocol processing performed by the FE I/F 110 in the first embodiment. In the second embodiment, in a case where a large number of host servers 200 are coupled, an increase in memory consumption of the controller 100 when the number of connections per host server 200 increases becomes a problem. In the second embodiment, when the host server 200 establishes a session to the storage system 1, the storage system 1 realizes connection control according to performance requirements of the host and a configuration on the storage side by performing processes from S1 to S4 described below.

(S11) The host server 200 starts session establishment to the storage system 1 in the same procedure as in the first embodiment.

(S12) The controller 100 in the storage system 1 that has received a negotiation request calculates a communication buffer size for in-capsule data. The controller 100 calculates the number of connections permitted to the host server 200, a communication buffer size, and an upper limit of the in-capsule data size that is an upper limit of a buffer usage per command, from the performance requirement of the host, the system configuration of the storage system 1, and a round trip time (RTT) between the host server 200 and the storage system 1 input by a user in advance, and gives a response to the FE I/F 110. Here, the second embodiment is different from the first embodiment in that such calculation is performed by the controller 100 instead of the FE I/F 110.

(S13) The controller 100 sends the number of connections and the in-capsule data size upper limit as a response to the negotiation request of the host server 200. Here, the number of connections is denoted by N.

(S14) The host server 200 starts a command request process for the storage system 1 on the storage system 1 in the same procedure as in the first embodiment.

According to the method described above, connection control optimized for the performance requirements of the host server, the distance to the storage system, and the configuration of the storage system can also be performed in the storage system 1 in which the protocol processing is performed by the controller 100. By using this method, it is possible to reduce memory consumption of the controller 100 while curbing performance degradation.

Note that the present invention is not limited to the above-described embodiments, and includes various modifications. For example, the above-described embodiments have been described in detail for better understanding of the present invention, and are not necessarily limited to those having all the described configurations. In addition, a part of the configuration of a certain embodiment can be replaced with the configuration of another embodiment, and the configuration of another embodiment can be added to the configuration of a certain embodiment. In addition, it is possible to add, delete, and replace other configurations for a part of the configuration of each embodiment.

In addition, some or all of the above-described configurations, functions, processing units, and the like may be designed with, for example, integrated circuits to be realized by hardware. Each of the above-described configurations, functions, and the like may be realized by software by a processor interpreting and executing a program for realizing each function. Information such as a program, a table, and a file for realizing each function may be stored in a recording device such as a memory, a hard disk, or an SSD, or a recording medium such as an IC card or an SD card.

In addition, the control lines and the information lines indicate what is considered to be necessary for the description, and do not necessarily indicate all the control lines and the information lines on a product. In practice, it may be considered that almost all the configurations are coupled to each other.

What is claimed is:

1. A storage system comprising:

a controller, wherein the controller includes a front-end interface that communicates with a host via a network, the front-end interface being a smart NIC that performs block protocol processing, and management information, the management information includes information indicating communication performance of the front-end interface with the host, the controller determines a communication control parameter including at least one of a connection upper limit number or a communication buffer size for in-capsule data in a session between the host and the front-end interface based on the communication performance, and the smart NIC offloads protocol processing from a processor of the controller to reduce controller load or dynamic memory optimization algorithms, wherein the communication control parameter includes a connection upper limit number in the session between the host and the front-end interface, the management information further includes information indicating a performance requirement of access from the host to the storage system, the controller determines the connection upper limit number based on a performance requirement of the host and performance of the front-end interface, and the controller sets the connection upper limit number to a value equal to or greater than a value obtained by dividing a number of ports of the front-end interface by a number of processor cores of the front-end interface.

2. The storage system according to claim 1, wherein the controller includes the processor and a memory that stores the management information, the processor determines the communication control parameter, the front-end interface includes a memory that stores the communication control parameter, and the front-end interface executes protocol processing in communication with the host according to the communication control parameter.

3. The storage system according to claim 1, wherein information indicating the performance of the front-end interface includes information regarding IOPS and an IO processing unit time, the management information further includes information regarding an IO queue length of the host, and the controller calculates a necessary number of IO connections using a formula:

necessary number of IO connections=host performance requirement×IO processing unit time/IO queue length, and sets the connection upper limit number to a larger one of a minimum number of IO connections and the necessary number of IO connections.

4. The storage system according to claim 1, wherein the communication control parameter indicates the communication buffer size in the session between the host and the front-end interface, the information indicating the communication performance includes information indicating a communication distance between the host and the front-end interface, and the controller determines the communication buffer size based on the information indicating the communication distance.

5. The storage system according to claim 4, wherein the information indicating the communication distance is a round trip time in communication with the host.

6. The storage system according to claim 1, wherein the communication control parameter indicates the communication buffer size in the session between the host and the front-end interface, the information indicating the communication performance includes information indicating whether or not communication between the host and the front-end interface is remote communication, and the controller determines a larger communication buffer size for the remote communication than for non-remote communication.

7. The storage system according to claim 1, wherein the communication control parameter includes the communication buffer size in the session.

8. The storage system according to claim 1, wherein when a free memory capacity of the front-end interface is equal to or less than a threshold, the controller disconnects a current session from the host and establishes a new session in a new communication control parameter.

9. A communication control method executed by a storage system comprising a processor of a controller and including a front-end interface that communicates with a host via a network, the front-end interface being a smart NIC that performs block protocol processing, and management information that includes information indicating communication performance of the front-end interface with the host, the communication control method comprising:

determining a communication control parameter including at least one of a connection upper limit number or a communication buffer size for in-capsule data in a session between the host and the front-end interface based on the communication performance; and reducing controller load or dynamic memory optimization algorithms by the smart NIC offloading protocol processing from the processor, wherein the communication control parameter includes a connection upper limit number in the session between the host and the front-end interface, the management information further includes information indicating a performance requirement of access from the host to the storage system, the controller determines the connection upper limit number based on a performance requirement of the host and performance of the front-end interface, and the controller sets the connection upper limit number to a value equal to or greater than a value obtained by dividing a number of ports of the front-end interface by a number of processor cores of the front-end interface.

10. The storage system according to claim 1, wherein the smart NIC executes functions of a network layer, a transport layer, and an application layer in addition to communication processing of a physical layer and a data link layer.

11. The storage system according to claim 1, wherein the controller changes the communication control parameter according to the performance requirement of the host, a distance between the host and the storage system, and a configuration of the storage system, thereby reducing a memory consumption amount of the front-end interface while maintaining performance.

12. The storage system according to claim 1, wherein the controller includes a connection control program that, when receiving an inquiry about a connection configuration from the front-end interface, calculates the connection upper limit number, an in-capsule data size upper limit, and a communication buffer amount, and provides a response to the front-end interface.

13. The storage system according to claim 1, wherein the management information includes information indicating an application type of access from the host to the storage system, the application type designating one of LAN access, WAN access, or remote backup, and the controller determines the communication buffer size based on a round trip time between the host and the storage system and the application type.

14. The storage system according to claim 13, wherein, when the round trip time is more than 1 ms or when the application type is WAN access or remote backup, the controller calculates an in-capsule data size upper limit, and calculates the communication buffer size by multiplying the in-capsule data size upper limit by an IO queue length of the host.

15. The storage system according to claim 1, wherein the controller allocates more communication buffers with a smaller number of IO connections to a host having a low performance requirement and a long distance from the storage system via WAN coupling, and allocates a smaller communication buffer with a larger number of IO connections to a host having a high performance requirement and a short distance from the storage system via LAN coupling.

16. The storage system according to claim 1, wherein the smart NIC includes a network interface that communicates with the host, an internal interface coupled to the controller via Peripheral Component Interconnect-Express, a processor, and a memory that stores the communication control parameter.

17. The storage system according to claim 1, wherein the smart NIC includes a plurality of CPU cores, and the smart NIC allocates a CPU core for each IO connection and distributes load on the CPU cores in units of connections.

18. The storage system according to claim 1, wherein the front-end interface allocates a communication buffer having the communication buffer size for each IO connection established in the session.

* * * * *